Feb. 19, 1924.

J. C. SAVAGE

Re. 15,771

METHOD OF PRODUCING VISUAL EFFECTS IN THE AIR AND APPARATUS THEREFOR

Original Filed Dec. 21, 1920

John C. Savage Inventor

By his Attorney

M. Chas Helmer

Reissued Feb. 19, 1924. Re. 15,771

UNITED STATES PATENT OFFICE.

JOHN C. SAVAGE, OF RYDE, ISLE OF WIGHT, ENGLAND, ASSIGNOR TO THE SKYWRITING CORPORATION OF AMERICA, A CORPORATION OF DELAWARE.

METHOD OF PRODUCING VISUAL EFFECTS IN THE AIR AND APPARATUS THEREFOR.

Original No. 1,426,413, dated August 22, 1922, Serial No. 432,237, filed December 21, 1920. Application for reissue filed April 19, 1923. Serial No. 633,222.

*To all whom it may concern:*

Be it known that I, JOHN CLIFFORD SAVAGE, subject of the King of Great Britain, residing at Ryde, Isle of Wight, England, have invented a new and useful Method of Producing Visual Effects in the Air and Apparatus Therefor, of which the following is a specification.

This invention relates to aviation and has particular but not exclusive reference to utilizing an aircraft in flight for advertising purposes by leaving a visible trail of smoke at intervals during flight and so regulating those intervals and so manœuvering the aircraft that signs, characters, letters or words are made visible in the air to observers on the ground.

The practical problem is to produce a sufficiently dense and permanent smoke or smoke-like effect from commercially practicable materials, and I have found that it is impracticable merely to regulate the exhaust gases or the liberation of special material from a single container carried on the aircraft. I have found that one solution of this problem is effected through the vaporization of a smoke producing ingredient or material, as for example, hydrocarbon oil, and I illustrate and describe means for effecting the said result through the heat of the exhaust gases.

One of the objects of my invention is to provide means for producing a sufficiently dense and permanent smoke or equivalent visible effect for advertising purposes, but by my invention I not only provide in this way means for advertising and public amusement but also means for scientific demonstration and similar purposes, whereby the path of flight of an aircraft may be traced and made visible and the airflow surrounding the aircraft may be explored and whereby by suitably disposing and arranging the nozzle or nozzles whereat the smoke producing materials are emitted an air craft may be given the appearance of being in flames.

The apparatus herein shown and described comprises an aircraft having two or more separate receptacles in which are stored different materials which when released and brought into reaction or admixture with one another either apart from or in conjunction with the engine exhaust gases, produce a smoke or equivalent visible medium. For example one material may be finely divided carbon and the other material may be oil which may be vaporized in the engine exhaust passage before the carbon is mixed with it. Other materials may of course be used and in fact the material in each of the two or more receptacles may be gaseous, liquid or solid, the essential condition being that when released and brought into contact with each other they will produce a visible medium. The discharge or emission from the receptacles may be regulated in any suitable manner as by valves under the control of the pilot or other occupant of the aircraft, and an air current derived from the flight of the aircraft may conveniently be utilized to aid the emission, and control the direction and distribution of the released substances, or the stream of exhaust engine gases may be utilized.

The above features of the invention and such others as are incidental thereto or hereinafter appear will now be described with reference to the accompanying drawings which represent one embodiment of the invention in an aeroplane.

In these drawings:—

Figure 3 is an enlarged sectional view of one form of one of the receptacles hereinbefore referred to.

Figure 1:
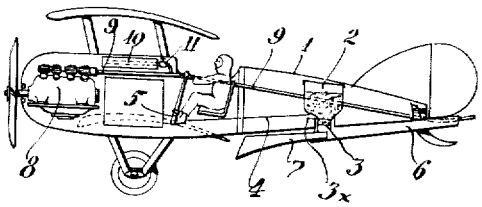
Figure 1 is a diagrammatic side sectional elevation of an aeroplane equipped with means for carrying out my invention.

In the fuselage 1 of the aeroplane the receptacle 2 is arranged having a flap valve 3 at the base connected by a rod 4 with a hand lever 5 to enable the pilot to operate the valve 3 as desired. In addition to the valve 3 an adjustable valve or shutter 3x may be provided to regulate the effective opening of the base of the receptacle. When the valve is moved to the open position the contents of the receptacle 2 escape downwards into a passage 6 extending rearwardly beneath the fuselage as shown. An air collecting chute 7 may be fixed beneath the fuselage in advance of the exit of the receptacle to collect air and direct it in a stream along the passage 6, the material emerging from the receptacle 2 being mixed with the air stream and conveyed by it to the nozzle of the passage whence it eventually escapes and is left in space.

Figure 2:
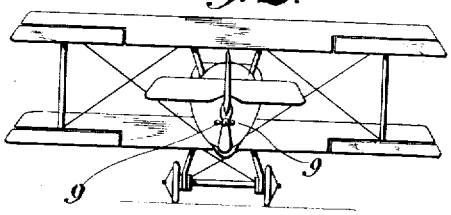
Figure 2 is a rear elevation.
Figure 3:
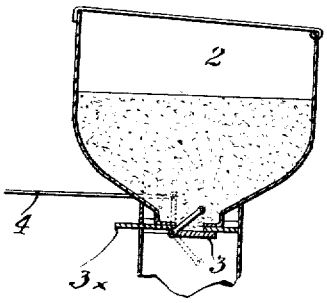

The material in the receptacle 2 may consist of finely divided carbon or an appropriate colour in powdered form or it may be a compound of such a character that a scintillating or sparkling effect will be produced in the air. The released substance is mixed with or sprayed in to a stream or streams of another substance or substances capable of reacting or mixing with the first substance to produce a visible medium. One such arrangement for this purpose is shown in Figures 1 and 2 where the exhaust gases from the engine 8 are led to the rear by two exhaust pipes 9 or by a single exhaust pipe so arranged that the exhaust gases escape symmetrically in the region of the nozzle of the passage 6, and a reservoir 10 having an outlet tap 11 under the control of the pilot or other occupant is provided to enable oil or other liquid to be admitted to the exhaust pipe to vaporize therein and mix with the stream of exhaust gases to produce a mixture of gases, vaporized liquid, and powdered or other material.

By suitably manœuvering the machine and controlling the discharge of the substances from the receptacle, any appropriate sign, character, letter or word may be formed in the air, such sign or the like being visible from the ground for a considerable distance.

A further application of the invention is to the quantitative and qualitative investigation of the conditions of the air and the behaviour of the air flow surrounding various parts of an aircraft in flight. For this purpose the means employed and the operations as above described can readily be applied, the visible medium being conducted for this purpose by a conduit or conduits to those portions of the aircraft in the vicinity of which it is desired to explore the airflow and released through suitably arranged and directed nozzles or jets. The rate of emission is preferably governable either automatically or by the occupant of the aircraft so that the speed of emission is equivalent to the relative airspeed the emission itself being capable of being interrupted at the will of the occupant.

With regard to the materials used in the receptacles they may be either solid liquids or gaseous as already stated, the essential condition being that they will react or mix with each other in such a manner as to create a dense smoke effect. For instance one of the materials used in the specific example above described is a liquid namely an oil and this is vaporized in the exhaust gas passage, while the other material is a solid namely powdered carbon and this is conveyed into admixture and suspension with the vaporized oil by an air current. Obviously however other substances in other physical condition might be used. For instance a gas or liquid chemically reacting with the vaporized oil to yield a dense smoke might be used in place of the powdered carbon mixing therewith.

What I claim is:—

1. The method of producing advertising signs comprising alphabetical letters, words, and designs, suspended in the air, which consists in the production or storing in an aeroplane of a smoke-like material of persistent visibility and manœuvering said plane in paths corresponding with the form of the desired sign, whilst emitting a trail of said smoke-like material at such height and in such volume that an advertisement is formed readable with the naked eye by persons distant on the earth.

2. As an aeronautic product, an advertising sign comprising a combination of alphabetical letters, words, or a design, composed of smoke suspended in the air and in form readable with the naked eye by persons distant on the earth.

3. Means for producing smoke effects in midair by means of an aircraft, comprising the combination with the aircraft, of a plurality of separate receptacles carried thereby, different materials therein capable by admixture or chemical reaction of producing a dense smoke effect, and means governable at the will of an occupant for regulating the emission of said materials, the aircraft being manœuvered to enable signs, letters, advertising and other effects to be produced in mid air by the regulated smoke.

4. Means for producing smoke effects in midair by means of aircraft, comprising the combination with the aircraft, of a plurality of receptacles carried thereby, a vaporizable hydrocarbon oil in one receptacle, a different material in another receptacle, and means governable at the will of the occupant for regulating the emission of said materials.

5. Means for producing smoke effects in midair by means of aircraft, comprising the combination with the aircraft, of a plurality of receptacles carried thereby, a vaporizable hydrocarbon oil in one receptacle, means for vaporizing said oil when released, a different material in another receptacle, and means governable at the will of the occupant for regulating the emission of said materials.

6. Means for producing smoke effects in midair by means of aircraft, comprising the combination with the aircraft, of a plurality of receptacles carried thereby, a vaporizable hydrocarbon oil in one receptacle, finely divided carbon in another receptacle, means for diffusing the carbon when released among the oil when released, and means governable at the will of the occupant for regulating the emission of said materials.

7. Means for producing smoke effects in midair by means of aircraft, comprising the combination with the aircraft, of a plurality of receptacles carried thereby, a vaporizable hydrocarbon oil in one receptacle, finely divided carbon in another receptacle, means for utilizing the exhaust gases of the aircraft to vaporize the oil when released, means for conveying the carbon when released into dispersed contact with the vaporized oil, and means governable at the will of the occupant for regulating the emission of said materials.

8. Means of producing smoke effects in midair by means of aircraft, comprising the combination with the aircraft, of a plurality of receptacles carried thereby, materials therein smoke-producing when released and brought together, and means governable at the will of the occupant for regulating the emission of said materials.

JOHN C. SAVAGE.

Witnesses:

W. Lee Helms,

Gordon R. Fellows.

Certificate of Correction.

It is hereby certified that in Reissue Letters Patent No. 15,771, granted February 19, 1924, upon the application of John C. Savage, of Ryde, Isle of Wight, England, for an improvement in "Methods of Producing Visual Effects in the Air and Apparatus Therefor," an error appears in the printed specification requiring correction as follows: Page 2, line 76, claim 1, for the word "and" read *or;* and that the said Letters Patent should be read with this correction therein that the same may conform to the record of the case in the Patent Office.

Signed and sealed this 1st day of April, A. D. 1924.

[SEAL.]

KARL FENNING,
*Acting Commissioner of Patents.*